United States Patent Office 3,014,005
Patented Dec. 19, 1961

3,014,005
RUBBER-ZINC SILICATE MASTERBATCH, AND
PROCESS FOR PREPARING SAME
Louis H. Howland, Watertown, and Woodrow W. White,
Oxford, Conn., assignors to United States Rubber Company, New York, N.Y., a corporation of New Jersey
No Drawing. Filed Nov. 25, 1958, Ser. No. 776,181
14 Claims. (Cl. 260—41.5)

This invention relates to masterbatches of synthetic rubbers and reinforcing fillers, and more particularly to masterbatches of synthetic rubbers containing basic nitrogen functional groups and zinc silicates.

It is known to make synthetic rubber-polyvalent metal silicate masterbatches where the polyvalent metal silicate, e.g. calcium silicate, is formed in-situ and is co-coagulated with the rubber in the latex by incorporating sodium silicate in the latex and then adding a water-soluble calcium salt to form the insoluble calcium silicate and to provide the polyvalent calcium ions to precipitate the rubber.

We have found that in the case of synthetic rubbers containing basic nitrogen functional groups, e.g. copolymers of butadiene and copolymerizable monomers containing an amino group, greatly improved reinforcing properties are obtained where the in-situ formed polyvalent metal silicate is zinc silicate and the zinc silicate which is co-coagulated with the latex has a molar ratio of zinc oxide to silica less than the molar ratio of zinc oxide to silica in normal zinc silicate, i.e. less than 1:1. Such a zinc silicate may be termed a zinc acid silicate. Our theory is that the excess acidic silica over the silica bonded to the zinc oxide gives salt bonds with the basic portion or amino groups of the synthetic rubber, and thus gives a much stronger reinforcement of the rubber than can be obtained with an in-situ formed normal zinc silicate filler.

In carrying out the present invention, an alkali-metal silicate is incorporated in the alkaline latex of the synthetic rubber containing basic nitrogen functional groups, and water-soluble zinc salt is mixed therewith in an acid medium to produce a final pH of less than 7 in the aqueous medium of the coagulated rubber and zinc silicate at the completion of the coagulation of the masterbatch, i.e. after addition of the water-soluble zinc salt. The pH of the latex is generally from 9 to 11.5. The final pH of the aqueous medium at the completion of the coagulation of the masterbatch is generally from 2 to 6 and preferably from 4.0 to 5.5. The relative amounts of the alkali-metal silicate and zinc salt are not important so long as the pH of the aqueous medium of the co-coagulum is less than 7, thereby producing a zinc acid silicate. The acidity of the final aqueous medium of the co-coagulum, or of the filtrate after separating the masterbatch, assures a molar ratio of zinc oxide to silica less than the 1:1 molar ratio of zinc oxide to silica in normal zinc silicate. Where the pH of the final aqueous medium or filtrate is 7 or above, only normal zinc silicate or normal zinc silicate and zinc hydroxide are co-coagulated with the rubber, and the highly reinforcing properties of the zinc acid silicate of the present invention are not obtained since there is no free acidic silica to form salt bonds with the basic nitrogen functional groups of the rubber. In general, in the masterbatches of the present invention, the molar ratio of zinc oxide to silica in the co-coagulated zinc silicate will be in the range from 0.05:1 to less than 1:1, and preferably from 0.05:1 to 0.9:1. The amount of such zinc silicate will generally be from 5 to 100 parts per 100 parts of the rubber, with the preferred range being from 10 to 60 parts per 100 parts of rubber.

A decided advantage of zinc silicate as the reinforcing agent as compared to other polyvalent metal silicates is that zinc oxide is normally used in most compounding recipes because it forms zinc soap which is solubilized and activates cure by solubilization of the other compounding ingredients. By using the zinc acid silicate no extraneous metal compounds are added which might compete with the zinc oxide in such a way as to retard the cure. The zinc salts are also known to have no bad effects on aging of compounds as is the case with some of the other multivalent metals such as iron. Zinc also forms a colorless or white sulfide and thus no discoloration would occur with sulfur cure of a white or light colored stock containing it. This of course, is quite important since the present invention is a method of obtaining very high reinforcement without the use of carbon black. In other words, the large beneficial role of zinc compounds over other metal compounds in vulcanization aids in producing the much superior masterbatches from the zinc acid silicate than from the other acid metal silicates. Also, the type of complexes that zinc forms with amino compounds give strong molecular bonds with rubbers containing basic nitrogen functional groups, which helps produce the superior tensile strength and abrasion resistance of vulcanizates of zinc acid silicate over other polyvalent metal silicates. The other polyvalent metal acid silicates that might form strong bonds with amino compounds promote rubber oxidation and thus hurt vulcanizates. It has been our observation that the nature of the reaction of a zinc salt to form zinc acid silicate in the presence of rubbers containing amino groups tends to form extremely finely divided precipitates which gives greater reinforcement as compared to the reaction of other polyvalent metal salts, and thus aids in giving the very superior vulcanizates.

The alkali-metal silicate which is mixed with the latex may be any of the commercial silicates having varying proportions of sodium or potassium oxide to silicon dioxide content. For example, "N" brand sodium silicate (Philadelphia Quartz Co.) is sold in the form of an aqueous solution of about 38% solids content, in which ratio $Na_2O:SiO_2$ is about 1:3.2. "RU" brand sodium silicate (Philadelphia Quartz Company) is sold in the form of a 47% aqueous solution in which the ratio $Na_2O:SiO_2$ is about 1:2.4. "KaSil No. 1" brand potassium silicate (Philadelphia Quartz Co.) is sold in the form of a 27% aqueous solution in which the ratio $K_2O:SiO_2$ is about 1:2.5. Other commercial alkali-metal silicates have ratios of alkali-metal oxide to silicon dioxide of 1:1.6, 1:2.0, 1:2.9, 1:3.75. Various other silicates, such as sodium meta silicate ($Na_2O.SiO_2$) and ordinary water glass ($Na_2O.4SiO_2$) may be used. Such alkali-metal silicates are highly alkaline.

The synthetic rubbers containing basic nitrogen functional groups to which the present invention is applicable may be copolymers of one or more 1,3-butadienes, e.g., butadiene-1,3, 2-methyl butadiene-1,3, chloroprene, piperylene, and 2,3-dimethyl butadiene-1,3, and one or more compounds which contain a $CH_2=C$ group at least one of which contains an amino group, and which are copolymerizable with butadienes-1,3, such as vinyl pyridines, e.g. 2-vinyl pyridine, 3-vinyl pyridine, 4-vinyl pyridine, 2-methyl-5-vinyl pyridine, 5-ethyl-2-vinyl pyridine, 2,4-dimethyl-6-vinyl pyridine, 2,4-diethyl-6-vinyl pyridine, and dialkyl-aminoalkyl acrylates, e.g., 2-dimethylamino-ethyl methacrylate and 2-diethylamino-ethyl methacrylate, dimethallylamine, ethylmethallylamine, N(dimethylamino-ethyl) methacrylamide, vinyl quinoline and p-N,N-dimethylamino styrene. Examples of compounds containing a $CH_2=C<$ group but not containing an amino group and which may be copolymerized with such butadienes and compounds which contain a $CH_2=C<$ group and an amino group are styrene, alpha-methyl styrene, vinyl toluene, chlorostyrene, dichlorostyrene, acrylonitrile, methacrylonitrile, alkyl acrylates, alkyl methacrylates, isopropenyl methyl ketone, e.g. in forming terpolymers of butadiene-1,3, vinyl pyridine and styrene. Such synthetic rubbers will generally contain a major proportion (51 to 95%) of the butadiene component, and a minor proportion (5 to 49%) of the component containing an amino group. The compound containing the basic nitrogen functional group may be copolymerized with the 1,3-butadiene in aqueous emulsion to form the latex directly as above described, or the copolymer may be formed by graft polymerizing the compound containing the basic nitrogen functional group on the rubber particles of a natural rubber latex or of a synthetic rubber latex prepared without such basic nitrogen functional groups, or the solid rubber containing basic nitrogen functional groups may be dispersed in water with conventional emulsifying and dispersing agents to form the latex, or a solid rubber not containing basic nitrogen functional groups may be dispersed in water to form a latex and the compound containing basic functional groups graft polymerized on the rubber particles in such latex. The latices of such synthetic rubbers may be compounded with compounding ingredients, extenders, softeners, plasticizers and the like before being co-precipitated with the zinc acid silicate.

The water-soluble zinc salt which is mixed with the synthetic rubber latex containing the alkali-metal silicate in an acid medium to give a pH of the aqueous medium of the coagulated synthetic rubber and zinc silicate of less than 7 may be a zinc salt of a strong acid such as zinc chloride, zinc sulphate or zinc nitrate, which, by hydrolysis, will supply its own acid medium and such hydrolyzed acid may be in sufficient amount to reduce the pH of the final aqueous medium of the coagulated masterbatch to below 7. In the case of water-soluble zinc salts of weak acids, such as zinc acetate, additional acid such as acetic, hydrochloric, sulfuric, or nitric acid will be added to reduce the pH of the aqueous medium of the coagulated synthetic rubber and zinc silicate to below 7. Where the zinc salt of a strong acid such as zinc chloride, zinc sulfate or zinc nitrate is added in insufficient amount to provide enough hydrolyzed acid to reduce the pH of the aqueous medium of the masterbatch to below 7, additional acid such as acetic, hydrochloric, sulfuric or nitric acid may be added with the zinc salt to reduce the pH of the aqueous medium of the masterbatch to below 7.

The masterbatches of the present invention may be compounded in conventional manner with compounding and vulcanizing ingredients, and if desired additional fillers. The masterbatches either compounded or uncompounded may be treated or processed by methods known to the art prior to vulcanization. For example, they may be heated to elevated temperature, such as 375° F. before masticizing, or may be masticated at low temperatures or at high temperature, such as 375° F. before finishing and vulcanizing. Such compounds may be used in the manufacture of all types of rubber articles, such as tires, heels, soles, belting and the like.

The following examples illustrate the present invention. All parts and percentages referred to herein are by weight.

EXAMPLE 1

A masterbatch of a butadiene-vinyl pyridine rubber with a zinc acid silicate in which the ratio of zinc oxide to silica was less than 1:1 was prepared as follows:

An alkaline synthetic rubber latex prepared by the copolymerization in aqueous emulsion of a mixture (recipe charge) of 75 parts of butadiene-1,3 and 25 parts of 2-methyl-5-vinyl pyridine having a rubber content of 24.1% was employed. 1660 mls. (400 grams of dry rubber) of the latex was stabilized against oxidation by the addition of 30 mls. (6.0 grams dry weight) of a 20% aqueous emulsion of condensed diphenylamine acetone reaction product. To this mixture was added with vigorous agitation 594 grams (85 grams of $SiO_2$) of a solution of sodium silicate which had been prepared by mixing 297 grams of water with 297 grams of a sodium silicate solution which had a specific gravity of 41° Bé. and contained 8.9% $Na_2O$ and 28.65% $SiO_2$. The resulting mixture was flocculated by the addition of 2000 mls. of a 10% solution of zinc chloride thus giving an aqueous slurry containing very fine crumbs of synthetic rubber coagulum very closely associated with precipitated zinc acid silicate. The mixture was filtered with suction through #4 Whatman filter paper giving a clear serum with a pH of 5.5. The filter cake was reslurried in water and filtered twice to insure removal of water-soluble impurities. The crumb was then dried overnight at 50–55° C. in a forced draft oven. The yield of masterbatch was 551 grams.

The dried masterbatch was analyzed for silica and zinc oxide by ashing, treating the ash with 6N hydrochloric acid (reporting the insoluble as silica and obtaining 100% yield of $SiO_2$) and titrating the soluble portion for zinc and calculating the result as zinc oxide. On the basis of these results, the molar ratio of zinc oxide to silica was 0.39:1 indicating that the masterbatch contained a filler of acid zinc silicate.

This masterbatch according to the present invention will be termed "Masterbatch A."

A second masterbatch of the same basic butadiene-vinyl pyridine rubber as above with a normal zinc silicate in which the ratio of silica to divalent metal oxide was 1:1 was prepared as follows:

1660 gms. (400 grams dry weight) of the same latex as above was stabilized against oxidation by the addition of 30 mls. (6 grams dry weight) of a 20% aqueous emulsion of condensed diphenylamine acetone reaction product. To this mixture was added with vigorous agitation 594 grams (85 grams of $SiO_2$) of a solution of sodium silicate which had been prepared by mixing 297 grams of water with 297 grams of a sodium silicate solution which had a specific gravity of 41° Bé. and contained 8.9% $Na_2O$ and 28.65% $SiO_2$. The resulting mixture was flocculated by the incremental addition of 2000 mls. of a 10% solution of zinc chloride concurrently with the addition incrementally of 800 mls. of 10% sodium hydroxide. The rate of addition of zinc chloride and sodium hydroxide being adjusted to maintain a pH of about 7.0 so as to promote the formation of the normal zinc silicate and prevent hydrolysis of it as it is formed. The fine crumbs of masterbatch obtained was filtered through #4 Whatman filter paper giving a clear serum with a pH of 7.2. The filter cake was reslurried in water (containg sufficient NaOH to maintain a pH of 7.4) and filtered twice to insure removal of water-insoluble impurities. The crumb was dried overnight at 50–55° C. in a forced draft oven and weighed 631 grams.

The dried masterbatch was analyzed for zinc and silica as was done for the previous masterbatch and the zinc oxide and silica were found to be present in the ratio of 1:1.

This masterbatch not in accordance with the present invention will be termed "Masterbatch B."

A portion of the above copolymer latex of 75 parts of butadiene-1,3 and 25 parts of 2-methyl-5-vinyl pyridine without addition of alkali-metal silicate and zinc salt was coagulated, washed and dried. The dried polymer will be termed "Rubber C".

As a control for comparison with conventional rubber compounds, a commercial GR–S synthetic rubber copolymer of 72 parts of butadiene and 28 parts of styrene (recipe charge) was used and will be termed "Rubber D."

A vulcanizable compound I (shown in column I of the table below) was prepared by mill mixing 350 parts of Masterbatch A (which contained 250 parts of the butadiene-vinyl pyridine rubber and 100 parts of the zinc acid silicate filler), 30 parts of Circosol 2XH (a petroleum hydrocarbon softener), 5 parts of sulfur, 5 parts of stearic acid, 12.5 parts of zinc oxide, and 7.5 parts of diethylene glycol.

A vulcanizable compound II (shown in column II of the table below) was prepared by mill mixing 273 parts of Masterbatch B (which contained 173 parts of the butadiene-vinyl pyridine rubber and 100 parts of the normal zinc silicate filler), 77 parts of rubber C (which increased the butadiene-vinyl pyridine rubber content to the same 250 parts as in compound I), 30 parts of Circosol 2XH, 5 parts of sulfur, 5 parts of stearic acid, 12.5 parts of zinc oxide, and 7.5 parts of diethylene glycol.

A vulcanizable compound III (shown in column III of the table below) was prepared by mill mixing 250 parts of rubber C, 100 parts of Hi-Sil (a commercial hydrated silica reinforcing filler), 30 parts of Circosol 2XH, 5 parts of sulfur, 5 parts of stearic acid, 12.5 parts of zinc oxide, and 7.5 parts of diethylene glycol.

A voulcanizable compound IV (shown in column IV of the table below) was prepared by mill mixing 250 parts of rubber C, 100 parts of medium processing channel carbon black, 30 parts of Circosol 2XH, 5 parts of sulfur, 5 parts of stearic acid, and 12.5 parts of zinc oxide.

A vulcanizable compound V (shown in column V of the table below) was prepared by mill mixing 200 parts of rubber D, 100 parts of high abrasion furnace carbon black, 4 parts of sulfur, 2 parts of stearic acid, and 6 parts of zinc oxide.

Compounds I to V also contained vulcanization accelerators for optimum cures. Compounded Mooney viscosities were run on compounds I to V. Compounds I to V were cured at 292° F. for varying times, and modulus, tensile strength and elongations were run on test pieces of the vulcanizates. Abrasion losses were determined on cured test pieces on a modified Lambourn abrader as described in Rubber Chemistry and Technology, 25, 191–208. Abrasion Resistance Ratings were determined from the abrasion losses using compound V as a standard (100%) or rating control; the higher the rating figure of comparative compounds, the greater is the abrasion resistance.

Results of the tests on compounds I to V are shown in the following table:

*Table of physical properties*

| Compound number | I | II | III | IV | V |
|---|---|---|---|---|---|
| Compounded Mooney viscosity ML-4 | (1) | 47 | 37 | 63 | 80 |
| 300 percent modulus, p.s.i.: | | | | | |
| 25' | 3,140 | 720 | 840 | 1,020 | 840 |
| 50' | 3,560 | 650 | 840 | 1,620 | 1,660 |
| 100' | 3,480 | 650 | 850 | 2,230 | 2,380 |
| Tensile strength, p.s.i.: | | | | | |
| 25' | 3,990 | 1,520 | 1,770 | 3,630 | 2,200 |
| 50' | 4,850 | 1,490 | 1,620 | 3,430 | 3,620 |
| 100' | 3,480 | 1,310 | 1,730 | 3,630 | 3,510 |
| Elongation, percent: | | | | | |
| 25' | 360 | 520 | 520 | 650 | 600 |
| 50' | 390 | 530 | 500 | 570 | 570 |
| 100' | 300 | 500 | 510 | 420 | 420 |
| Abrasion loss, gms./3,000 ft.: | | | | | |
| 25' | 0.042 | 0.517 | 0.257 | 0.112 | 0.225 |
| 50' | 0.049 | 0.383 | 0.215 | 0.112 | 0.210 |
| 100' | 0.038 | 0.390 | 0.253 | 0.097 | 0.188 |
| Abrasion resistance rating, percent: | | | | | |
| 25' | 168 | 61 | 93 | 133 | 2 100 |
| 50' | 162 | 71 | 99 | 130 | 2 100 |
| 100' | 166 | 65 | 85 | 132 | 2 100 |
| Avg | 165 | 66 | 92 | 132 | 2 100 |

1 Too high to run.
2 Rating control.

Column I of the above table illustrates the exceptionally high degree of reinforcement of butadiene-vinyl pyridine copolymer synthetic rubbers by the present invention as compared to other types of synthetic rubber reinforcement as shown in columns II to V. This extraordinary reinforcement according to the present invention is evidenced by the very high compounded Mooney viscosity, tensile strength, and abrasion resistance.

EXAMPLE 2

A masterbatch (A in following table) of a basic rubber (a copolymer of butadiene with 2-diethylaminoethyl methacrylate) with a zinc acid silicate in which the molar ratio of zinc oxide to silica is less than 1:1 was prepared from a synthetic rubber latex made by the copolymerization in alkaline aqueous emulsion of a mixture of 75 parts of butadiene-1,3 and 25 parts of 2-diethylaminoethyl methacrylate. 1550 mls. (250 grams of dry rubber) of the latex was stabilized against oxidation by the addition of 18.7 mls. (3.75 grams dry weight) of a 20% aqueous emulsion of condensed diphenylamine acetone reaction product. To this mixture was added with vigorous agitation 370 grams (53 grams of $SiO_2$) of a solution of sodium silicate which had been prepared by mixing 185 grams of water with 185 grams of a sodium silicate solution which had a specific gravity of 41° Bé. and contained 8.9% $Na_2O$ and 28.65% $SiO_2$. The resulting mixture was flocculated by the addition of 1700 mls. of a 10% solution of zinc chlorine thus giving an aqueous slurry containing very fine crumbs of synthetic rubber coagulum very closely associated with coprecipitated acid zinc silicate. The mixture was filtered with suction through #4 Whatman filter paper giving a clear serum with a pH of 4.25. The filter cake was reslurried in water and filtered twice to insure removal of water-soluble impurities. The crumb was then dried overnight at 50–55° C. in a forced draft oven. The yield of masterbatch was 325 grams.

On the basis of the yield and since the silica is always obtained in 100% yield the molar ratio of ZnO to $SiO_2$ was 0.254:1.

A second masterbatch (B in following table) was prepared using the same latex, but with a silicate in which all the silica was combined with polyvalent metal oxide. 1550 mls. (250 grams of dry rubber) of the latex was stabilized against oxidation by the addition of 18.7 mls. (3.75 gms. dry weight) of a 20% aqueous emulsion of condensed diphenylamine acetone reaction product. To this mixture was added with vigorous agitation 296 grams (42.4 gms. of $SiO_2$) of a solution of sodium silicate which had been prepared by mixing 148 grams of water with 148 grams of sodium silicate solution which had a specific gravity of 41° Bé. and contained 8.9% $Na_2O$ and 28.65% $SiO_2$. The resulting mixture was flocculated by the incremental addition of 1250 mls. of a 10% solution of zinc chloride concurrently with the addition incrementally of 10% sodium hydroxide. The rate of addition of zinc chloride and sodium hydroxide being adjusted to maintain a pH of ca. 7.0 so as to promote the formation of the normal zinc silicate and prevent hydrolysis of it as it is formed. The fine crumbs of masterbatch obtained was filtered through #4 Whatman filter paper giving a clear serum with a pH of 7.7. The filter cake was reslurried in water (containing sufficient NaOH to maintain a pH of 7.0) and filtered twice to insure removal of water-insoluble impurities. The crumb was dried overnight at 50–55° C. in a forced draft oven and weighed 368 grams.

On the basis of the yield the molar ratio of ZnO to $SiO_2$ was 1.25:1.

These stocks were compounded on a 6" laboratory mill in the recipes as given in the following table where they are compared with a GR-S synthetic rubber (72 parts of butadiene and 28 parts of styrene recipe charge) compound containing 50 parts of a high abrasion furnace black (Stock C).

| | Weight of ingredients in grams | | |
|---|---|---|---|
| | A | B | C |
| Weight of masterbatch | 260 | 295 | |
| Weight of rubber in masterbatch | 200 | 200 | |
| Weight of rubber (GR-S) | | | 400 |
| Carbon black | | | 200 |
| Hydrocarbon softening oil | 24 | 24 | |
| Sulfur | 6 | 6 | 8 |
| Stearic acid | 4 | 4 | 4 |
| Zinc oxide | 10.0 | 10.0 | 12.0 |
| Di-phenyl guanidine | | | 2.4 |
| Benzothiazyl disulfide | 2.0 | 2.0 | 2.8 |
| Tetra methyl thiuram disulfide | 0.6 | 0.6 | |
| 2,6-di-tert. butyl-p-cresol | 2.0 | 2.0 | |
| Diethylene glycol | 6.0 | 6.0 | |
| Compounded Mooney viscosity, ML-4 | >200 | 154 | 72 |
| 300% modulus, p.s.i. (cured at 292° F.): | | | |
| 25' | | 720 | 740 |
| 50' | | 810 | 2,010 |
| 100' | 1,950 | 760 | 2,400 |
| Tensile strength, p.s.i.: | | | |
| 25' | 1,690 | 1,110 | 1,890 |
| 50' | | 1,250 | 3,430 |
| 100' | 2,040 | 1,210 | 3,210 |
| Elongation, Percent: | | | |
| 25' | | 230 | 400 | 650 |
| 50' | | 380 | 510 |
| 100' | 310 | 400 | 580 |
| Abrasion loss, gms./3,000 ft.: | | | |
| 25' | 0.055 | 0.658 | 0.265 |
| 50' | 0.061 | 0.541 | 0.232 |
| 100' | 0.065 | 0.693 | 0.157 |
| Abrasion resistance rating, Percent: | | | |
| 25' | 185 | [1] 100 | |
| 50' | 180 | [1] 100 | |
| 100' | 183 | [1] 100 | |
| Avg | 183 | [1] 100 | |
| 25' | 166 | 57 | [1] 100 |
| 50' | 158 | 60 | [1] 100 |
| 100' | 141 | 37 | [1] 100 |
| Avg | 155 | 51 | [1] 100 |

[1] Rating controls.

The data in the above table show that the A stock according to the present invention has much higher compounded Mooney viscosity, tensile strength, and abrasion resistance than the B stock containing the normal zinc silicate. These results show the very high degree of reinforcement obtainable by the present invention compared with presently known filler materials and this is even more significant when it is noted that our stock A product contained only 30 parts compared with 42.5 parts of filler in stock B.

This application is a continuation-in-part of our application Serial No. 645,411 filed March 12, 1957, now abandoned.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A process which comprises incorporating an alkali-metal silicate in a latex of a rubber containing basic nitrogen functional groups, and coagulating the rubber and forming a masterbatch therewith of zinc silicate by mixing with such latex containing the alkali-metal silicate, a water-soluble zinc salt in an acid medium to produce a final pH of 2 to less than 7 in the aqueous medium of the coagulated rubber and zinc silicate at the completion of the coagulation of the masterbatch, the molar ratio of zinc oxide to silica in the zinc silicate being from 0.05:1 to less than 1:1, and the zinc silicate being in amount from 5 to 100 parts per 100 parts of said rubber.

2. A process which comprises incorporating an alkali-metal silicate in a latex of a rubber containing amino groups, and coagulating the rubber and forming a masterbatch therewith of zinc silicate by mixing with such latex containing the alkali-metal silicate a water-soluble zinc salt in an acid medium to produce a final pH of 2 to 6 in the aqueous medium of the coagulated rubber and zinc silicate at the completion of the coagulation of the masterbatch, the molar ratio of zinc oxide to silica in the zinc silicate being from 0.05:1 to 0.9:1, and the zinc silicate being in amount from 5 to 100 parts per 100 parts of said rubber.

3. A process which comprises incorporating an alkali-metal silicate in a latex of a synthetic rubber copolymer of a conjugated diene and a copolymerizable unsaturated monomer containing an amino group, and coagulating the rubber and forming a masterbatch therewith of zinc silicate by mixing with such latex containing the alkali-metal silicate a water-soluble zinc salt in an acid medium to produce a final pH of 2 to less than 7 in the aqueous medium of the coagulated rubber and zinc silicate at the completion of the coagulation of the masterbatch, the molar ratio of zinc oxide to silica in the zinc silicate being from 0.05:1 to less than 1:1, and the zinc silicate being in amount from 5 to 100 parts per 100 parts of said rubber.

4. A process which comprises incorporating an alkali-metal silicate in a latex of a synthetic rubber copolymer of a butadiene-1,3 and copolymerizable material selected from the group consisting of vinyl pyridines, dialkylaminoalkyl acrylates, dialkylaminoalkyl methacrylates, dimethallylamine, ethylmethallylamine, N(dimethylaminoethyl) methacrylamide, vinyl quinoline and p-N,N-dimethylamino styrene, and coagulating the rubber and forming a masterbatch therewith of zinc silicate by mixing with such latex containing the alkali-metal silicate a water-soluble zinc salt in an acid medium to produce a final pH of 2 to less than 7 in the aqueous medium of the coagulated rubber and zinc silicate at the completion of the coagulation of the masterbatch, the molar ratio of zinc oxide to silica in the zinc silicate being from 0.05:1 to less than 1:1, and the zinc silicate being in amount from 5 to 100 parts per 100 parts of said rubber.

5. A process which comprises incorporating an alkali-metal silicate in a latex of a synthetic rubber copolymer of a butadiene-1,3 and a copolymerizable monomer which contains a $CH_2=C<$ group and an amino group, and coagulating the rubber and forming a masterbatch therewith of zinc silicate by mixing with such latex containing the alkali-metal silicate a water-soluble zinc salt in an acid medium to produce a final pH of 2 to 6 in the aqueous medium of the coagulated rubber and zinc silicate at the completion of the coagulation of the masterbatch, the molar ratio of zinc oxide to silica in the zinc silicate being from 0.05:1 to 0.9:1, and the zinc silicate being in amount from 5 to 100 parts per 100 parts of said rubber.

6. A process which comprises incorporating an alkali-metal silicate in a latex of a synthetic rubber copolymer of butadiene-1,3 and a vinyl pyridine, and coagulating the rubber and forming a masterbatch therewith of zinc silicate by mixing with such latex containing the alkali-metal silicate zinc chloride in an acid medium to produce a final pH of 2 to less than 7 in the aqueous medium of the coagulated rubber and zinc silicate at the completion of the coagulation of the masterbatch, the molar ratio of zinc oxide to silica in the zinc silicate being from 0.05:1 to 0.9:1, and the zinc silicate being in amount from 5 to 100 parts per 100 parts of said rubber.

7. A process which comprises incorporating an alkali-metal silicate in a latex of a synthetic rubber copolymer of butadiene-1,3 and 2-methyl-5-vinyl pyridine, and coagulating the rubber and forming a masterbatch therewith of zinc silicate by mixing with such latex containing the alkali-metal silicate zinc chloride in an acid medium to produce a final pH of 2 to 6 in the aqueous medium of the coagulated rubber and zinc silicate at the completion of the coagulation of the masterbatch, the molar ratio of zinc oxide to silica in the zinc silicate being from 0.05:1 to 0.9:1, and the zinc silicate being in amount from 5 to 100 parts per 100 parts of said rubber.

8. A masterbatch which is the co-coagulum of a latex of a rubber containing basic nitrogen functional groups and of an in-situ formed zinc silicate, said masterbatch containing 5 to 100 parts of zinc silicate per 100 parts of said rubber, the zinc silicate in said masterbatch having a molar ratio of zinc oxide to silica from 0.05:1 to 0.9:1.

9. A masterbatch which is the co-coagulum of a latex of a rubber containing amino groups and of an in-situ formed zinc silicate, said masterbatch containing 5 to 100 parts of zinc silicate per 100 parts of said rubber, the zinc silicate in said masterbatch having a molar ratio of zinc oxide to silica from 0.05:1 to less than 1:1.

10. A masterbatch which is the co-coagulum of a latex of a synthetic rubber copolymer of a conjugated diene and a copolymerizable unsaturated monomer containing an amino group and of an in-situ formed zinc silicate, said masterbatch containing 5 to 100 parts of zinc silicate per 100 parts of said rubber, the zinc silicate in said masterbatch having a molar ratio of zinc oxide to silica from 0.05:1 to 0.9:1.

11. A masterbatch which is the co-coagulum of a latex of a synthetic rubber copolymer of a butadiene-1,3 and material selected from the group consisting of vinyl pyridines, dialkylaminoalkyl acrylates, dialkylaminoalkyl methacrylates, dimethallylamine, ethylmethallylamine, N(dimethylaminoethyl) methacrylamide, vinyl quinoline and p-N,N-dimethylamino styrene, said masterbatch containing 5 to 100 parts of zinc silicate per 100 parts of said rubber, the zinc silicate in said masterbatch having a molar ratio of zinc oxide to silica from 0.5:1 to less than 1:1.

12. A masterbatch which is the co-coagulum of a latex of a synthetic rubber copolymer of a butadiene-1,3 and a copolymerizable monomer which contains a $CH_2=C<$ group and an amino group and of an in-situ formed zinc silicate, said masterbatch containing 5 to 100 parts of zinc silicate per 100 parts of said rubber, the zinc silicate in said masterbatch having a molar ratio of zinc oxide to silica from 0.5:1 to less than 1:1.

13. A masterbatch which is the co-coagulum of a latex of a synthetic rubber copolymer of butadiene-1,3 and a vinyl pyridine and of an in-situ formed zinc silicate, said masterbatch containing 5 to 100 parts of zinc silicate per 100 parts of said rubber, the zinc silicate in said masterbatch having a molar ratio of zinc oxide to silica from 0.05:1 to 0.9:1.

14. A masterbatch which is the co-coagulum of a latex of a synthetic rubber copolymer of butadiene-1,3 and 2-methyl-5-vinyl pyridine and of an in-situ formed zinc silicate, said masterbatch containing 5 to 100 parts of zinc silicate per 100 parts of said rubber, the zinc silicate in said masterbatch having a molar ratio of zinc oxide to silica from 0.05:1 to 0.9:1.

References Cited in the file of this patent

UNITED STATES PATENTS

| | | |
|---|---|---|
| 2,429,439 | Westfall et al. | Oct. 21, 1947 |
| 2,485,287 | Henson et al. | Oct. 18, 1949 |
| 2,914,503 | Pechukas | Nov. 24, 1959 |

FOREIGN PATENTS

| | | |
|---|---|---|
| 156,807 | Australia | June 1, 1954 |